United States Patent [19]

Tomioka et al.

[11] 4,357,040

[45] Nov. 2, 1982

[54] VEHICLE BUMPER MOUNTING STRUCTURE

[75] Inventors: Hirotaka Tomioka; Shyuji Yamagata, both of Yokohama, Japan

[73] Assignee: Nissan Motor Co., Ltd., Yokohama, Japan

[21] Appl. No.: 113,241

[22] Filed: Jan. 18, 1980

[30] Foreign Application Priority Data

Jan. 29, 1979 [JP] Japan ................................. 54-8180

[51] Int. Cl.³ ............................................ B60R 19/08
[52] U.S. Cl. .................................... 293/102; 296/207
[58] Field of Search ................. 296/207, 76, 188, 189, 296/195, 56, 50, 146, 209; 293/102, 109, 136

[56] References Cited

U.S. PATENT DOCUMENTS

| | | | |
|---|---|---|---|
| 3,666,310 | 5/1972 | Burgess et al. | 293/109 |
| 3,739,882 | 6/1973 | Schwenk et al. | 293/136 |
| 3,851,867 | 12/1974 | Fricko | 296/56 |
| 4,029,353 | 6/1977 | Borenyi et al. | 296/207 |

FOREIGN PATENT DOCUMENTS 1403032 5/1965 France ................................. 296/56

Primary Examiner—Joseph F. Peters, Jr.
Assistant Examiner—Ross Weaver
Attorney, Agent, or Firm—Thompson, Birch, Gauthier & Samuels

[57] ABSTRACT

A shock absorbing vehicle bumper for a vehicle with an openable rear lid, the shock absorbing portion of the bumper being mounted to the lower end of the rear lid with a front surface of the shock absorbing portion facing a surface of a cross member mounted to the vehicle such that collision forces are directly transmitted to the vehicle through the shock absorbing portion and the cross member.

12 Claims, 5 Drawing Figures

[4,357,040]

VEHICLE BUMPER MOUNTING STRUCTURE

BACKGROUND OF THE INVENTION

1. Field of the Invention

The present invention relates to a mounting structure of a vehicle bumper secured to the lower end of either a trunk lid or a back door.

2. Description of the Prior Art

A typical vehicle bumber mounting structure of the prior art uses one or more bumper stays secured to a rear bumper, and the rear bumper is mounted to the surface of the lower end of a rear panel by fixing the bumper stays to a rear side member of the vehicle. Whereby a large part of the load at the time of collision at the rear bumper is directly transmitted to the vehicle body.

With the aforesaid bumper mounting structure of the prior art, however, it is necessary to provide a desired spacing between the rear bumper and the lower end of the trunk lid or the back door for facilitating the easy opening and closing of the trunk lid or the back door, and the work for providing such spacing is combersome. Besides, in order to secure the rear bumper at a desired position of the rear panel, the position of a luggage floor panel of a luggage room becomes comparatively high, and hence, the space of the luggage room becomes small, resulting in a shortcoming of inability of placing a large luggage therein. Another drawback is in that the comparatively high position of the luggage floor panel and the presence of the rear bumper projecting from the rear panel tend to make it cumbersome to load and unload luggages to and from the luggage room following the opening and closing of the trunk lid or the back door. Especially, in the case of a rear bumper of shock absorbing type, the degree of projection from the rear panel is large and the loading and unloading of the luggage is still more cumbersome.

To avoid the aforesaid inconvenience, a modified bumper mounting structure has been proposed, wherein a rear bumper is mounted to outer side surfaces at the lower end of the trunk lid or the back door, so that impact at the time of collision is transmitted to the vehicle body through the trunk lid or the back door. With this modified bumper mounting structure, the rear bumper is mounted to the trunk lid or the back door, so that when the trunk lid or the back door is opened for loading or unloading the luggage, the rear bumper does not hamper the operation, and the position of the luggage floor panel of the luggage room can be selected low by considering the position of the lower end of the trunk lid or the back door, for allowing the formation of a comparative large space of the luggage room.

With the aforesaid modified bumper mounting structure, however, the rear bumper is mounted to the outer surface of the lower end of the trunk lid or the back door and the collision impact at the time of collision to the rear bumper is transmitted to the vehicle body through the trunk lid or the back door, so that it is necessary to somehow reinforce the trunk lid or the back door for preventing the breakage of the trunk lid or the back door itself. Another difficulty with this modified bumper mounting structure is in that the collision impact is also applied to the hinge of the trunk lid or the back door and may damage the hinge structure, so that it may become necessary to renew the entire assembly of the trunk lid or the back door because simple reparing of the trunk lid or the back door alone may become inadequate under such conditions.

The present invention has been accomplished in view of the aforesaid difficulties of the prior art. An object of the present invention is to provide an improved vehicle bumper mounting structure which ensures a large luggage room space allowing easy loading and unloading of luggages relative to the luggage room without being disturbed by the presence of a rear bumper and minimizes the effect of the rear bumper by transmitting the impact at a collision directly to a vehicle body without passing through a trunk lid or a back door.

SUMMARY OF THE INVENTION

A vehicle bumper mounting structure according to the present invention is for a vehicle with a trunk lid or a back door mounted at a rear portion thereof in an openable and closeable manner, and comprises a rear bumper secured to lower end of the trunk lid or the back door, the rear bumper having a front surface thereof facing a rear portion of a floor structure of the body of the vehicle with or without a spacing therefrom. Whereby, most of collision impact at the rear bumper is directly transmitted to the body of the vehicle without passing through the trunk lid or the back door. In a preferred embodiment of the present invention, the rear portion of the floor structure of the vehicle body comprises a rear panel, a luggage floor panel, and a cross member, and the front surface of the rear bumper faces the rear surface of the cross member.

BRIEF DESCRIPTION OF THE DRAWING

For a better understanding of the present invention, reference is made to the accompanying drawing, in which.

DESCRIPTION OF THE PREFERRED EMBODIMENTS

Figure 1:
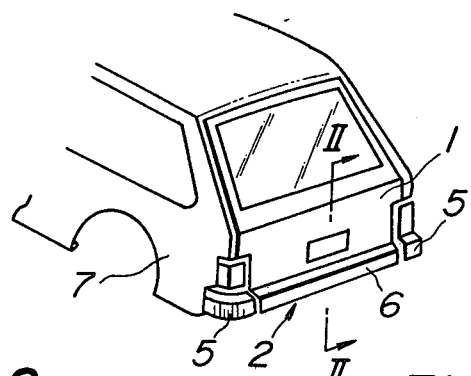
FIG. 1 is a schematic perspective view showing a position for mounting a vehicle bumper mounting structure of the present invention, for the case of the so-called van type automobile.

The present invention will be described by referring to embodiments illustrated in the drawing showing those as applied to the so-called van type vehicles.

Figure 2:
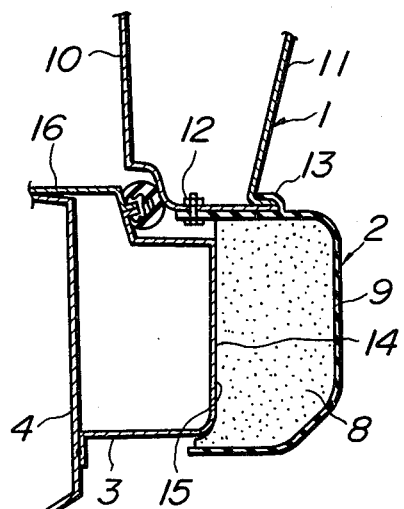
FIG. 2 is a cross-sectional view of an embodiment of the bumper mounting structure according to the present invention, taken along the line II—II of FIG. 1.

In an embodiment shown in FIGS. 1 and 2, a rear bumper 2 comprises three separate parts; namely, two parts of the rear bumper 2 located at opposite ends 5 thereof secured to a rear panel 4 or rear side panels 7, respectively, and a part of the rear bumper 2 which is located at the central portion 6 thereof and secured to the lower end of a back door 1. The three parts of the rear bumper 2 are so disposed that, when the back door 1 is closed, the three parts are aligned along a straight line.

Referring to FIG. 2, the rear bumper 2 secured to the lower end of the back door 1 is formed of a shock absorbing member 8 consisting of a shaped body of foamed urethane or a shaped body made by shaping polyethylene in a honeycomb network, which shock absorbing member 8 is enclosed by a bumper covering 9 made of resin or rubber and deformable in unison with the member 8. The rear bumper 2 is secured to the back door 1, by fixing a part of the bumper covering 9 to the lower end of an inner panel 10 by a suitable fixing means such as one or more screws 12, while forcing flange portions 13 of the inner panel 10 and an outer panel 11 of the back door 1 to bitingly engage a part of the bumper covering 9. Thus, the rear bumper 2 is so firmly secured that the secured portion is stable against shocks at the time of closing the back door 1. The bumper covering 9 is also adhered to the shock absorbing member 8.

On the other hand, a cross member 3 with a U-shaped cross section is connected to a rear panel 4 so as to extend outwardly from a vehicle body in such a manner that, when the back door 1 is at the closed position thereof, a front surface 14 of the rear bumper 2 secured to the lower end of the back door, i.e., that surface of the shock absorbing member 8 which faces the rear panel 4, is adapted to come in direct contact with a rear surface 15 of the cross member 3. Besides, one end of a luggage floor panel 16 is welded to one end of the cross member 3, and a sealing is provided at a gap formed among the back door 1, the luggage floor panel 16 and the cross member 3.

As a result, with the rear bumper mounting structure of the aforesaid first embodiment of the invention, when the back door 1 is closed, the front surface 14 of the rear bumper 2 secured to the lower end of the back door 1 is in contact with the rear surface 15 of the cross member 3, so that upon occurrence of a collision, the rear bumper 2 is supported by the cross member 3. Whereby, the collision impact acting through the rear bumper 2 is directly transmitted to the vehicle body without passing through the back door 1, and the shock absorbing efficiency of the rear bumper 2 is improved. In addition, the risk of breakage of the back door 1 itself and the hinged portion of the back door 1 is eliminated, so that the damage at the time of collision can be reduced. Besides, the luggage floor panel 16 is placed at a position corresponding to the lower end of the back door 1, so that a large luggage room space can be ensured, and the securing of the rear bumper 2 to the back door 1 prevents the rear bumper 2 from hampering the loading and unloading relative to the luggage room while opening the back door 1 and makes it easy to load and unload luggages.

Figure 3:
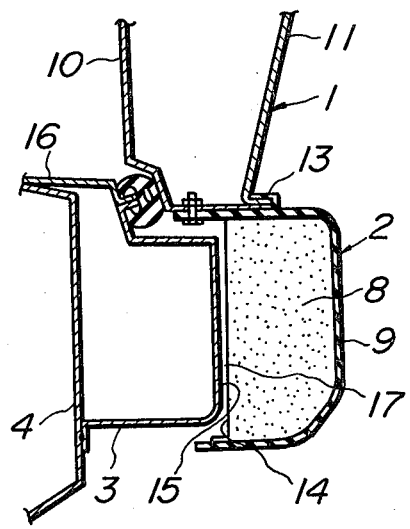
FIGS. 3 and 4 are cross-sectional views showing other embodiments of the bumper mounting structure of the present invention, taken along a line corresponding to the line II—II of FIG. 1, respectively.

Referring to FIG. 3 illustrating a second embodiment of the present invention, the second embodiment differs from the first embodiment in that, when a back door 1 is closed, the front surface of a rear bumper 2 is kept in the proximity of the rear surface 15 of a cross member 3, while leaving a small gap 17, for instance about 5 mm to 10 mm, between the rear bumper 2 and the cross member 3.

With the rear door mounting structure according to the aforesaid second embodiment of the invention, upon occurrence of a collision, the rear bumper 2 moves slightly so as to fill up the gap 17 for causing the front surface 14 of the rear bumper 2 to come in contact with the rear surface 15 of the cross member 3, so that the same effects as those of the first embodiment can be achieved. Furthermore, in the case of the second embodiment, due to the presence of the gap 17 between the rear bumper 2 and the cross member 3, even when there is an over stroke in the closing swing of the back door 1, usually the rear bumper 2 seldom comes in contact with the cross member 3, and the shock at the time of closing the door 1 can be reduced.

Figure 4:
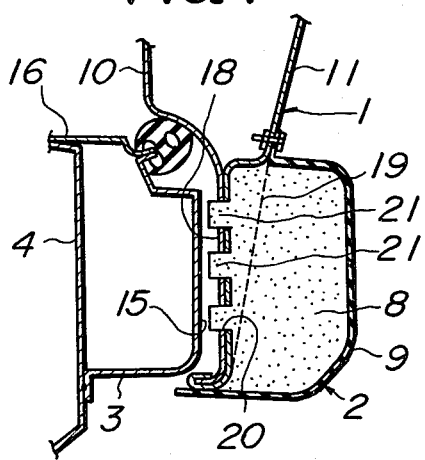
Figure 5:
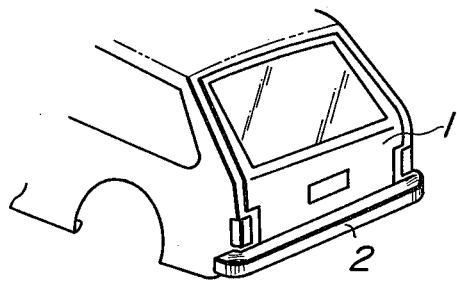
FIG. 5 is a schematic perspective view showing a mounting position of the bumper mounting structure according to the present invention, which position is different from that of FIG. 1.

In a third embodiment of the present invention as shown in FIG. 4, a cross member 3 is secured to a rear panel 4, and the lower end portion of a back door 1 is extended downwardly, and a mounting portion 18 for a rear bumper 2 is formed on the thus extended lower end of the back door 1 so as to face the rear surface 15 of the cross member 3. The aforesaid mounting portion 18 is a flange made by welding extended portions of an inner panel 10 and an outer panel 11 of the back door 1, and several to several tens of beads 19 are formed on the outer panel 11 for enhancing the strength and the rigidity of the outer panel 11. A plurality of through holes 20 are bored through the mounting portion 18.

The rear bumper 2 to be mounted on the aforesaid mounting portion 18 is similar to that of the first embodiment in that the bumper 2 is a shock absorbing bumper consisting of a shock absorbing member 8 enclosed by a bumper covering 9, but in the case of the third embodiment, the front surface of the shock absorbing member 8, i.e., the surface thereof facing the rear panel 4, has bosses 21 formed thereon so as to fit in the aforesaid through holes 20 bored on the mounting portion 13. The projecting portions of the bosses 21 extend completely through the aforesaid through holes 20 and can reach the proximity of the rear surface of cross member 3.

With the rear bumper mounting structure according to the third embodiment of the invention, not only the same effects as those of the aforesaid first and second embodiments can be achieved, but also an increased strength of the mounted portion of the rear bumper 2 can be achieved by the use of the beads 19 formed on the outer panel 11 at the mounting portion 18. Besides, the rear bumper 2 can be more firmly fixed to the mounting portion 18, as compared with the case without the beads 19, and the rear bumper 2 is free from shaking during the opening and closing operations of the back door 1.

It is noted here that the aforesaid first to third embodiments of the present invention use a rear bumper 2 formed of three separate parts, as shown in FIG. 1, but the present invention is not restricted to such formation, and it is possible to mount a unitary bumper 2 formed in one piece onto the lower end of a back door 1, so that when the back door 1 is swung upward for opening, the entire rear bumper 2 may be also moved upward together with the back door 1.

In the foregoing first to third embodiments, the bumper mounting structure of the present invention is applied to a van type vehicle, but it is also possible to apply the present invention to other type vehicles, such as to a vehicle having a trunk lid whose rear end is to assume a position in the proximity of a luggage floor panel.

Furthermore, in each of the aforesaid embodiments, the rear bumper is described as a bumper of shock absorbing type, but the bumper to be used in the present invention is not necessarily limited to the aforesaid type, but other type bumpers, such as a metallic rear bumper, can be used together with the bumper mounting structure of the present invention.

As described in the foregoing, with the bumper mounting structure of the above described construction, a rear bumper is fixed to the lower end of a trunk lid or a back door and a cross member is secured to a vehicle body so as to support the rear bumper, so that most of the impact at the time of a collision can be directly transmitted to the vehicle body without passing through the trunk lid or the back door for utilizing the function of the rear bumper to a maximum extent while preventing breakage of the hinge portion of the trunk lid or the back door. Besides, since the luggage floor panel can be disposed at a position corresponding to the lower end of the trunk lid or the back door, it is possible to ensure a large luggage room space. Furthermore, the fact that the rear bumper is secured to the trunk lid or the back door prevents the rear bumper from disturbing the loading and unloading of luggage with the trunk lid or the back door opened, for ensuring easy loading and unloading.

Although the invention has been described with respect to particular embodiments, but various modifications may be possible without departing from the scope of the present invention.

What is claimed is:

1. A shock absorbing vehicle bumper mounting structure for a vehicle with an openable rear lid, comprising a bumper covering and a shock absorbing member at least partially enclosed by said bumper covering, a cross member mounted to the vehicle below the rear lid, said shock absorbing member being secured to a lower end of the rear lid by said covering in such a manner that a front surface of said shock absorbing member faces a rear surface of said cross member, whereby shock from a collision is substantially and directly transmitted to the vehicle through said shock absorbing member and said cross member.

2. A vehicle bumper mounting structure as set forth in claim 1, wherein said openable rear lid is a trunk lid.

3. A vehicle bumper mounting structure as set forth in claim 1, wherein said openable rear lid is a back door.

4. A vehicle bumper mounting structure as set forth in claim 1, wherein said front surface of said shock absorbing member faces and is configured to contact said rear surface of said cross member when the rear lid is closed.

5. A vehicle bumper mounting structure as set forth in claim 1, wherein said front surface of said shock absorbing member faces and is spaced from said rear surface of said cross member when the rear lid is closed.

6. A vehicle bumper mounting structure as set forth in claim 1, wherein said vehicle includes a rear panel and a luggage floor panel, and said cross member is mounted to said rear panel and said luggage floor panel.

7. A vehicle bumper mounting structure as set forth in claim 1, wherein said openable rear lid includes an inner panel and an outer panel, and a mounting portion for securing said rear bumper is formed by extending said inner and outer panels downwardly and welding the extended portions of the inner and outer panels.

8. A vehicle bumper mounting structure as set forth in claim 7, wherein said outer panel of the rear lid has a plurality of reinforcing beads provided thereon.

9. A vehicle bumper mounting structure as set forth in claim 1 wherein said bumper covering includes a pair of end sections and a central section, the end sections and the central section being aligned when the rear lid is closed.

10. A vehicle bumper mounting structure as set forth in claim 1 wherein said bumper covering is a unitary structure.

11. A shock absorbing bumper for a vehicle having an openable rear lid, said bumper comprising:
   (a) a cross member mounted in a fixed position beneath said lid;
   (b) a deformable covering secured to said lid, said covering cooperating with said cross member to define a substantially enclosed space when said rear lid is closed; and
   (c) a shock absorbing member connected to said covering and arranged in said space.

12. The shock absorbing bumper as claimed in claim 11 wherein a forward surface of said shock absorbing body is exposed to and is in juxtaposition with a rearward surface of said cross member, with the remaining surfaces of said shock absorbing member being encapsulated by said deformable covering.

* * * * *